United States Patent [19]

Muramatsu et al.

[11] Patent Number: 5,167,403
[45] Date of Patent: Dec. 1, 1992

[54] FLUID-FILLED ELASTIC MOUNT HAVING TWO ORIFICE PASSAGES ONE OF WHICH IS SELECTIVELY OPENED AND CLOSED BY MEANS OF VACUUM PRESSURE

[75] Inventors: Atsushi Muramatsu, Komaki; Yoshiki Funahashi, Iwakura; Akiyoshi Ide, Inuyama, all of Japan

[73] Assignee: Tokai Rubber Industries, Ltd., Japan

[21] Appl. No.: 832,077

[22] Filed: Feb. 6, 1992

[30] Foreign Application Priority Data

Feb. 14, 1991 [JP] Japan .................... 3-42510

[51] Int. Cl.$^5$ ............................. F16M 5/00
[52] U.S. Cl. ................. 267/140.13; 267/219; 267/64.14
[58] Field of Search ........... 267/35, 140.1 R, 140.1 A, 267/140.1 E, 140.1 AE, 219, 64.14; 248/550, 562, 566, 636, 638; 92/49, 75

[56] References Cited

U.S. PATENT DOCUMENTS

| | | | |
|---|---|---|---|
| 4,546,960 | 10/1985 | Abrams et al. | 267/140.1 AE |
| 4,828,234 | 5/1989 | Hoying et al. | 267/140.1 AE |
| 4,867,263 | 9/1989 | Sugino et al. | 267/140.1 A |
| 4,869,477 | 9/1989 | Hoying et al. | 267/140.1 AE |
| 4,886,251 | 12/1989 | Hausserman | 267/140.1 A |

FOREIGN PATENT DOCUMENTS

| | | |
|---|---|---|
| 55-107142 | 8/1980 | Japan . |
| 60-220239 | 11/1985 | Japan . |
| 49731 | 2/1989 | Japan ........... 267/140.1 A |
| 85537 | 3/1990 | Japan ........... 267/140.1 A |

Primary Examiner—Robert J. Oberleitner
Assistant Examiner—Kevin D. Rutherford
Attorney, Agent, or Firm—Parkhurst, Wendel & Rossi

[57] ABSTRACT

A fluid-filled elastic mount is disclosed which includes a first and a second support member, an elastic body for interconnecting the support members and partially defining a pressure-receiving chamber, and a partition structure which cooperates with a first and a second flexible diaphragm to define a first and a second equilibrium chamber. The elastic mount has a first and a second orifice passage for fluid communication between the pressure-receiving chamber and the respective equilibrium chambers. The elastic mount further has an air chamber on one side of the second diaphragm remote from the second equilibrium chamber, and an operating chamber separated from the air chamber by a biasing elastic member. The operating chamber is subjected to a vacuum pressure as needed to move the second diaphragm away from the opening of the second orifice passage, which is normally closed by the second diaphragm due to a biasing force of the biasing elastic member. The elastic mount further includes a rigid planar member interposed between a top plate of the biasing elastic member and the second diaphragm. Between the rigid planar member and the top plate of the biasing elastic member is formed an air passage for permitting an air flow into a central portion of abutting faces thereof upon abutting contact therebetween.

17 Claims, 6 Drawing Sheets

FIG.1

TO ATMOSPHERE

EXPOSED TO ATMOSPHERE

CONNECTED TO VACUUM PRESSURE SOURCE

EXPOSED TO ATMOSPHERE

FLUID-FILLED ELASTIC MOUNT HAVING TWO ORIFICE PASSAGES ONE OF WHICH IS SELECTIVELY OPENED AND CLOSED BY MEANS OF VACUUM PRESSURE

BACKGROUND OF THE INVENTION

1. Field of the Invention

The present invention relates in general to a fluid-filled elastic mount for damping or isolating vibrations based on the flow of a fluid contained therein. More particularly, the present invention is concerned with such a fluid-filled elastic mount which is simple in construction, and is capable of exhibiting different vibration damping or isolating characteristics based on the fluid flow through differently tuned orifices, depending upon the type or frequency of the vibrations applied thereto.

2. Discussion of the Prior Art

An elastic mount is known as a vibration damping device interposed between two members of a vibration system, for flexibly connecting these two members. As a type of this elastic mount, there is known a so-called fluid-filled elastic mount as disclosed in JP-A-55-107142. The elastic mount disclosed in this publication includes a first and a second support structure which are spaced apart from each other in a load-receiving direction and are elastically connected to each other by an elastic body interposed therebetween. The elastic mount further includes a partition member supported by the second support structure and extending in a direction substantially perpendicular to the load-receiving direction. A pressure-receiving chamber which is partially defined by the elastic body is formed on one side of the partition member, while a variable-volume equilibrium chamber which is partially defined by a flexible diaphragm is formed on the other side of the partition member. These pressure-receiving and equilibrium chambers are filled with a suitable non-compressible fluid, and communicate with each other by an orifice passage. A pressure of the fluid in the pressure-receiving chamber changes due to elastic deformation of the elastic body upon application of vibrations in the load-receiving direction. The fluid-filled elastic mount damps or isolates the input vibrations based on resonance of the fluid mass flowing through the orifice passage, more effectively than an elastic mount which relies upon only the elastic property of the elastic body for damping the input vibrations. For this reason, the elastic mount of this type is widely used for motor vehicles, for example, as a mount for mounting the engine on the vehicle body.

Generally, the fluid-filled elastic mount when used as a vehicle engine mount is required to exhibit high damping capability with respect to relatively low-frequency vibrations, such as engine shake and bounce, and to provide a sufficiently low dynamic spring constant with respect to relatively high-frequency vibrations, such as engine idling vibrations and booming noise. However, an improvement in the vibration damping or isolating function of the mount based on the resonance of the fluid mass can be provided with respect to only the vibrations whose frequencies are in the neighborhood of the frequency to which the orifice passage is tuned. Where the orifice passage is tuned so that the mount exhibits a high damping effect with respect to the low-frequency vibrations, for example, the orifice passage operates as if the passage was substantially closed when the mount receives the vibrations whose frequencies are higher than the tuned frequency of the orifice passage. As a result, the elastic mount suffers from an undesirably increased dynamic spring constant, and from considerable deterioration of the isolating function with respect to the high-frequency vibrations.

To solve the above-described problem encountered in the known fluid-filled elastic mount, it is proposed to provide two mutually independent orifice passages, one of which is tuned to provide a sufficiently reduced dynamic spring constant to isolate the high-frequency vibrations, and the other of which is tuned to effectively damp the low-frequency vibrations.

The above-indicated one of the two differently tuned orifice passages is tuned so that the resonance frequency of the fluid mass flowing therethrough is higher than that of the fluid mass flowing through the other orifice passage, and so that the flow resistance of the fluid in the one orifice passage is smaller than that of the fluid in the other orifice passage. Therefore, upon application of a vibrational load, the fluid filling the elastic mount tends to flow between the pressure-receiving and equilibrium chambers, only through the above-indicated one orifice passage having the smaller flow resistance, i.e., the orifice passage for isolating the high-frequency vibrations. Consequently, it is rather difficult to ensure a sufficient amount of the fluid flowing through the other orifice passage so as to effectively damp the low-frequency vibrations.

In view of the above drawback of the proposed fluid-filled elastic mount, the assignee of the present application proposed another fluid-filled elastic mount as disclosed in JP-A-60-220239, which includes a control valve for selectively opening and closing the above-indicated one orifice passage tuned to the higher resonance frequency, and an actuator for operating the control valve. The control valve is controlled by the actuator so that the one orifice passage is automatically opened and closed to permit the elastic mount to exhibit different vibration damping and isolating characteristics, based on the fluid flow through the selected one of the two orifice passages, depending upon the type of the input vibrations.

In the thus constructed fluid-filled elastic mount, however, the provision of the control valve in the relevant orifice passage along with the actuator disposed in the elastic mount results in increased structural complexity and a comparatively large size of the elastic mount. Accordingly, the cost of manufacture of the elastic mount is inevitably increased.

SUMMARY OF THE INVENTION

It is therefore an object of the present invention to provide a fluid-filled elastic mount which is simple in construction, and which is capable of selectively exhibiting different vibration damping and isolating characteristics based on the flow of a fluid through a selected one of two differently tuned orifice passages, depending upon the type or frequency of the input vibrations.

The above object may be achieved according to the principle of the present invention, which provides a fluid-filled elastic mount for flexibly connecting two members, comprising: (a) a first support member and a second support member which are respectively fixed to the two members to be flexibly connected, and which are spaced apart from each other in a load-receiving direction in which vibrations are applied to the elastic mount; (b) an elastic body interposed between the first and second support members for elastically connecting the first and second support members; (c) a partition structure supported by the second support member and extending in a direction substantially perpendicular to the load-receiving direction; (d) the elastic body at least partially defining a pressure-receiving chamber disposed on one of opposite sides of the partition structure on the side of the first support member, the pressure-receiving chamber being filled with a non-compressible fluid, a pressure of the fluid in the pressure-receiving chamber changing due to elastic deformation of the elastic body upon application of the vibrations in the load-receiving direction; (e) a first flexible diaphragm cooperating with the partition structure to define a first equilibrium chamber which is filled with the non-compressible fluid, the first flexible diaphragm being elastically deformable so as to permit volume changes of the first equilibrium chamber to absorb pressure changes of the fluid in the first equilibrium chamber; (f) means for defining a first orifice passage which communicates with the pressure-receiving chamber and the first equilibrium chamber so as to permit flow of the fluid therebetween; (g) a second flexible diaphragm cooperating with the partition structure to define a second equilibrium chamber which is filled with the non-compressible fluid, the second flexible diaphragm being elastically deformable so as to permit volume changes of the second equilibrium chamber to absorb pressure changes of the fluid in the second equilibrium chamber; (h) means for defining a second orifice passage which communicates with the pressure-receiving chamber and the second equilibrium chamber so as to permit flow of the fluid therebetween, the second orifice passage having a ratio of a cross sectional area thereof to a length thereof, which ratio is higher than that of the first orifice passage; (i) a biasing elastic member disposed on one of opposite sides of the second flexible diaphragm remote from the second equilibrium chamber, the biasing elastic member including a top plate facing the second flexible diaphragm and having a biasing force for forcing the second flexible diaphragm to close an opening of the second orifice passage; (j) the biasing elastic member cooperating with the second flexible diaphragm to define therebetween an air chamber which is exposed to an atmosphere and permits elastic deformation of the second flexible diaphragm; (k) a rigid planar member accommodated in the air chamber between the second flexible diaphragm and the top plate of the biasing elastic member, the biasing force of the biasing elastic member acting on the second flexible diaphragm through the rigid planar member; (l) means for forming an air passage between abutting faces of the rigid planar member and the top plate of the biasing elastic member, for permitting an air flow into a central portion of the abutting faces upon abutting contact between the rigid planar member and the biasing elastic member; (m) the biasing elastic member partially defining an operating chamber which is separated from the air chamber by the biasing elastic member; and (n) pressure control means for applying a vacuum pressure to the operating chamber to draw the biasing elastic member away from the second flexible diaphragm, thereby eliminating the biasing force acting on the second flexible diaphragm, so that the second flexible diaphragm is moved away from the opening of the second orifice passage, thereby opening the second orifice passage for fluid communication with the second equilibrium chamber.

In the fluid-filled elastic mount constructed as described above according to the present invention, the pressure control means is operated so that the fluid is caused to flow through a selected one of the first and second orifice passages which are tuned to different frequency ranges of vibrations. Accordingly, the present elastic mount exhibits desired vibration damping and isolating characteristics based on the fluid flow through the selected one orifice passage, depending upon the type of the input vibrations. Since the pressure control means may be almost entirely disposed outside the body of the elastic mount, the present elastic mount is considerably simple in construction, without requiring a control valve, an actuator and other devices incorporated within the elastic mount.

In the fluid-filled elastic mount according to the invention, the biasing elastic member is provided for closing the second orifice passage due to its elasticity, against the pressure of the fluid in the pressure-receiving chamber. This biasing elastic member is sucked and deformed due to the vacuum pressure applied to the operating chamber, to thereby open the second orifice passage. Since the biasing elastic member exhibits a smaller spring constant upon its deformation due to the vacuum pressure, than that exhibited upon its deformation due to the fluid pressure of the pressure-receiving chamber, the second orifice passage is surely kept closed upon application of large-frequency vibrations, and is easily opened with a relatively small vacuum pressure applied to the operating chamber upon application of small-frequency vibrations. Thus, the control of opening and closing the second orifice passage is effected with high certainty and reliability, assuring significantly improved vibration damping and isolating capability of the elastic mount.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
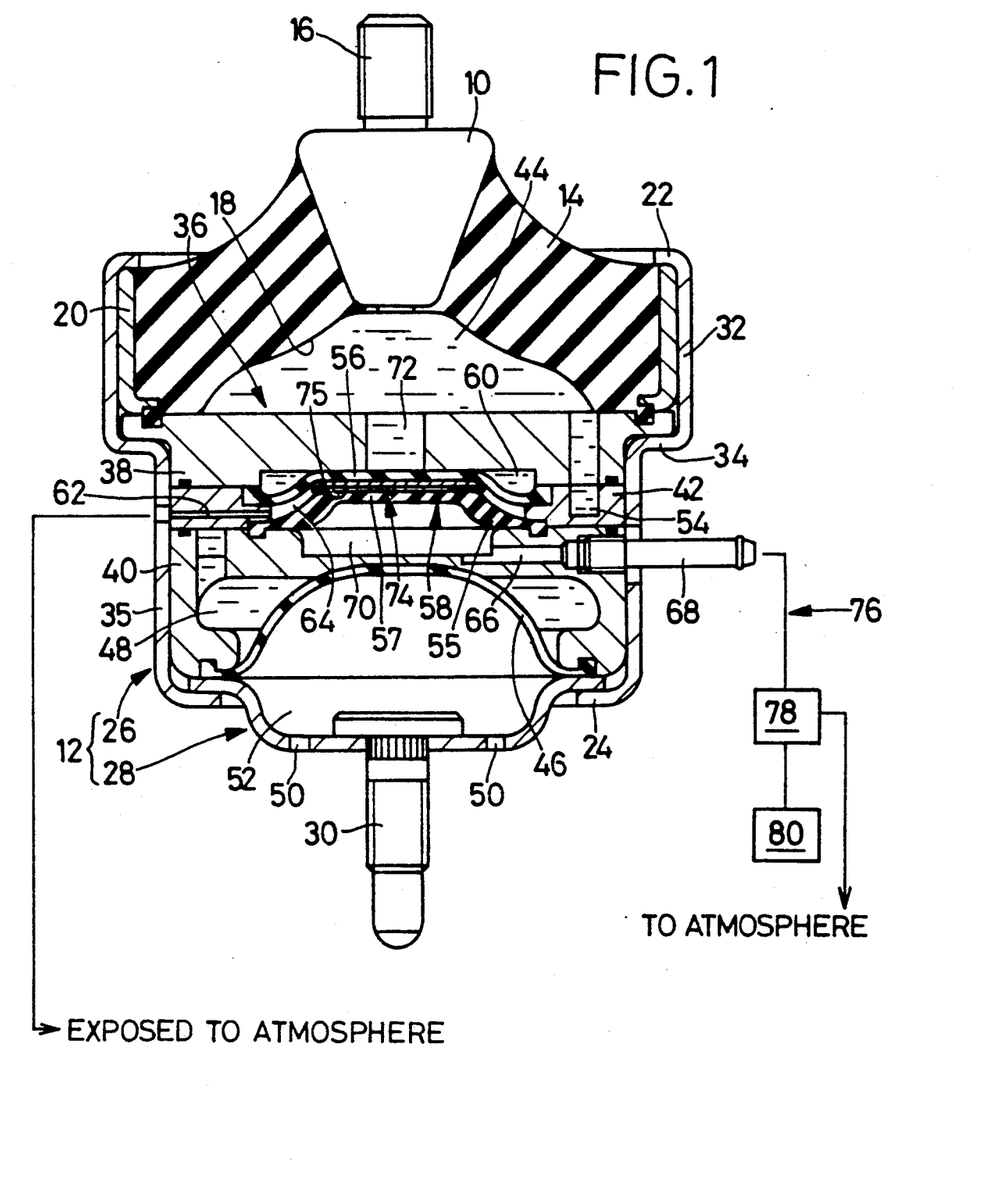
FIG. 1 is an elevational view in axial cross section of one embodiment of a fluid-filled elastic mount of the present invention in the form of an engine mount for a motor vehicle.

Referring first to FIG. 1 showing the vehicle engine mount as one embodiment of the fluid-filled elastic mount of this invention, reference numerals 10 and 12 denote a first and a second rigid support member, respectively. These first and second support members 10, 12 are opposed to each other and spaced apart from each other by a suitable distance, in a load-receiving direction in which vibrations are received by the engine mount. Between the first and second support members 10, 12, there is formed an elastic body 14 such that the two members 10, 12 are elastically connected to each other by the elastic body 14. The instant engine mount is installed on a motor vehicle such that the first support member 10 is fixed to an engine unit including an engine of the vehicle, while the second support member 12 is fixed to a body of the vehicle. Thus, the engine unit is flexibly mounted on the vehicle body in a vibration damping or isolating manner. With the engine mount installed in position on the vehicle as described above, the weight of the engine unit acts on the mount in the direction in which the first and second support members 10, 12 are opposed to each other, whereby the elastic body 14 is elastically deformed or contracted so that the two support members 10, 12 are moved toward each other from their pre-installation positions by a suitable distance in the above-indicated direction. The instant engine mount is adapted to damp or isolate the input vibrations which are applied primarily in the direction (vertical direction as viewed in FIG. 1) in which the first and second support members 10, 12 are opposed to each other, that is, the above-indicated load-receiving direction.

More specifically, the first support member 10 is a metallic member having a generally truncated conical shape. A mounting bolt 16 is formed integrally with the first support member 10 such that the bolt 16 protrudes in the load-receiving direction from a central portion of the large-diameter end face of the support member 10, axially outwardly of the engine mount. The engine mount is fixed to the vehicle engine unit through the mounting bolt 16.

The above-indicated elastic body 14 is secured by vulcanization to the first support member 10. This elastic body 14 has a generally truncated conical shape, and is formed with a cavity 18 which is open in its large-diameter end face on the side of the second support member 12. The first support member 10 is bonded by vulcanization to the small-diameter end face of the elastic body 14, while a cylindrical connecting member 20 made of metal is bonded by vulcanization to the outer circumferential surface of a large-diameter end portion of the elastic body 14. Thus, the first support member 10, elastic body 14 and connecting member 20 are formed into an integral unit, by means of vulcanization of a suitable rubber material for the elastic body 14.

The second support member 12 consists of a generally cylindrical member 26 with an axially intermediate stepped portion 34, and a dish-like bottom member 28 fixed to the cylindrical member 26 to close one opening of the member 26 at its small-diameter axial end. The cylindrical member 26 includes a large-diameter portion 32, a small-diameter portion 35 and the stepped portion 34 disposed therebetween. The cylindrical member 26 further includes caulked portions 22, 24 formed at its axially opposite end portions, and is fixed at the caulked portion 24 to an outer peripheral portion of the bottom member 28. Thus, the second support member 12 as a whole is a generally cup-shaped structure having a relatively large depth. A mounting bolt 30 is formed on the second support member 12 so as to protrude in the load-receiving direction from a central portion of the bottom member 28, axially outwardly of the engine mount. The engine mount is fixed to the vehicle body through the mounting bolt 30.

The above-indicated connecting member 20 secured to the outer surface of the elastic body 14 is fitted in the large-diameter portion 32 of the cylindrical member 26 of the second support member 12, such that the connecting member 20 is axially gripped by and between the stepped portion 34 and caulked portion 22 of the cylindrical member 26. In this manner, the second support member 12 is assembled with the integral unit of the first support member 10, elastic body 14 and connecting member 20. Thus, the first and second support members 10, 12 are opposed to each other in the load-receiving direction (vertical direction as viewed in FIG. 1) with a suitable spacing therebetween, with the elastic body 14 interposed between these two support members 10, 12 for flexible connection therebetween.

Within the small-diameter portion 35 of the cylindrical member 26 of the second support member 12, there is accommodated a thick-walled, generally circular partition structure 36 which extends in a direction substantially perpendicular to the load-receiving direction. The partition structure 36 includes an upper and a lower disc-like partition member 38, 40, and an axially intermediate annular partition member 42 interposed therebetween. These three partition members 38, 40, 42 are coaxially superposed on each other in the axial direction of the engine mount, and are fixedly attached to the second support member 12. Between the interfaces of the partition members 38, 40 and 42 are provided suitable 0 rings for ensuring fluid-tightness between these members 38, 40 and 42.

Between the partition structure 36 and the first support member 10, there is formed a pressure-receiving fluid chamber 44 which is partially defined by the elastic body 14. This pressure-receiving chamber 44 is filled with a suitable non-compressible fluid, such as water, alkylene glycol, polyalkylene glycol, or silicone oil. When a vibrational load is applied between the first and second support members 10, 12, a pressure of the fluid in the pressure-receiving chamber 44 changes as a result of a volume change of the chamber 34 due to elastic deformation of the elastic body 14.

Between the partition structure 36 and the bottom member 28 of the second support member 12, on the other hand, there is formed an enclosed space remote from the pressure-receiving chamber 44. A first flexible diaphragm 46 is accommodated in the enclosed space such that the diaphragm 46 is fluid-tightly gripped at its perimeter by and between the partition structure 36 (lower partition member 40) and the bottom member 28. The first diaphragm 46 is adapted to divide the space between the partition structure 36 and the bottom member 28, into two sections, i.e., a first variable-volume equilibrium chamber 48 and a first air chamber 52. The first equilibrium chamber 48, which is formed between the partition structure 36 and the first diaphragm 46, is filled with the non-compressible fluid as described above. The equilibrium chamber 48 will not undergo pressure changes upon application of vibrations to the engine mount, since the pressure change is absorbed by volume changes of the chamber 48 due to elastic deformation or displacement of the first diaphragm 46. The first air chamber 52, which is formed between the first diaphragm 46 and the bottom member 28, is exposed to the atmosphere through holes 50 formed through the bottom member 28, and allows the elastic deformation of the first diaphragm 46.

The partition structure 36 has a first orifice passage 54 formed in the circumferential direction through radially outer portions of the upper, intermediate and lower partition members 38, 42, 40, over a given circumferential length (slightly shorter than one round in this embodiment). The pressure-receiving chamber 44 and the first equilibrium chamber 48 are held in fluid communication with each other, through the first orifice passage which permits flow of the fluid therethrough between the two fluid chambers 44, 48.

The intermediate partition member 42 has a center bore which is substantially closed by the upper and lower partition members 38, 40, whereby the partition structure 36 is formed with a space which is separated from the pressure-receiving chamber 44 and the first equilibrium chamber 48. Within the space formed in the partition structure 36, there is accommodated a second flexible diaphragm 56 such that its peripheral portion is fluid-tightly gripped by and between the upper and intermediate partition members 38, 42. In a portion of the space between the second diaphragm 56 and the lower partition member 40, there is accommodated a dish-shaped biasing rubber member 58 which consists of a leg portion 55 having a hollow truncated conical shape and a disc-like top plate 57 closing the small-diameter opening of the leg portion 55. This biasing rubber member 58 is fluid-tightly gripped at its perimeter by and between the intermediate and lower partition members 42, 40. The biasing rubber member 58 is disposed so as to protrude toward the second diaphragm 56 such that the top plate 57 faces one major surface of the second diaphragm 56 on the side of the lower partition member 40. Thus, the space in the partition structure 36 is divided by the second diaphragm 56 and rubber member 58 into three sections.

More specifically, between the second flexible diaphragm 56 and the upper partition member 38 is formed a second equilibrium chamber 60 which is filled with the non-compressible fluid as described above. The second equilibrium chamber 60 will not undergo pressure changes upon application of vibrations to the engine mount, since the pressure change is absorbed by volume changes of the chamber 60 due to elastic deformation of the second diaphragm 56. Between the second diaphragm 56 and the biasing rubber member 58, there is formed a second air chamber 64 which is exposed to the atmosphere, through a hole 62 formed through the intermediate partition member 42 and cylindrical member 26. Further, an operating chamber 70 is formed between the biasing rubber member 58 and the lower partition member 40, which chamber communicates with the exterior of the mount, through an air passage 66 formed through the lower partition member 40, and a connector 68 having an end portion screwed into an open end portion of the air passage 66.

The upper partition member 38 has a second orifice passage 72 formed at its central portion through the entire thickness thereof in the axial direction of the mount. The second equilibrium chamber 60 is in fluid communication with the pressure-receiving chamber 44, through the second orifice passage 72 which permits flow of the fluid therethrough between the two chambers 44, 60. As is apparent from FIG. 1, the second orifice passage 72 has a larger cross sectional area and a smaller flow length than the first orifice passage 54. That is, the ratio of the cross sectional area to the length of the second orifice passage 72 is larger than that of the first orifice passage 54. Accordingly, the resonance frequency of the fluid flowing through the second orifice passage 72 is set to be higher than that of the fluid flowing through the first orifice passage 54.

In the instant embodiment, the first orifice passage 54 is tuned so that the engine mount is able to effectively damp the input vibration in a relatively low frequency range around 10Hz, such as engine shake or bounce, based on resonance of a mass of the fluid in the first orifice passage 54. On the other hand, the second orifice passage 72 is tuned so that the engine mount exhibits a sufficiently reduced dynamic spring constant with respect to the input vibrations in a relatively high frequency range around 25-45 Hz, such as engine idling vibrations, based on the resonance of a mass of the fluid in the second orifice passage 72.

Within the second air chamber 64, there is accommodated a disc-like intermediate thin plate 74 made of a rigid material such as resin or metal, such that the rigid plate 74 is interposed between the second diaphragm 56 and the top plate 57 of the biasing rubber member 58. The top plate 57 abuts on the upper partition member 38 through the rigid plate 74 and second diaphragm 56, whereby the biasing rubber member 58 is forced at its end face against the upper partition member 38. In this condition, the biasing rubber member 58 is subjected to preliminary compression in the axial direction, with its height (i.e., axial dimension) reduced from the nominal height, and is thus pre-loaded to bias the second diaphragm 56 against the upper partition member 38. In this arrangement, the elasticity of the biasing rubber member 58 acts on the second diaphragm 56 through the intermediate rigid plate 74, so that the second diaphragm 56 is pressed or forced against the upper partition member 38 so as to close one opening of the second orifice passage 72. The intermediate rigid plate 74 is not fixed to the second diaphragm 56 nor the biasing rubber member 58, so as not to affect the elastic deformation of these diaphragm 56 and rubber member 58.

Figure 2:
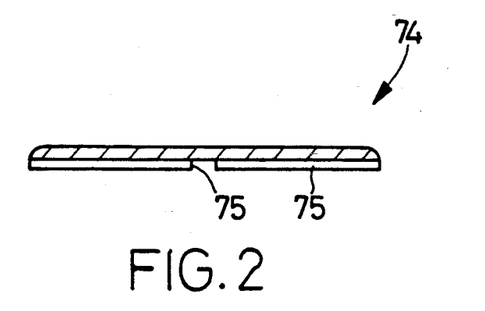
FIG. 2 is an enlarged axial cross sectional view showing an intermediated rigid plate used in the engine mount of FIG. 1.
Figure 3:
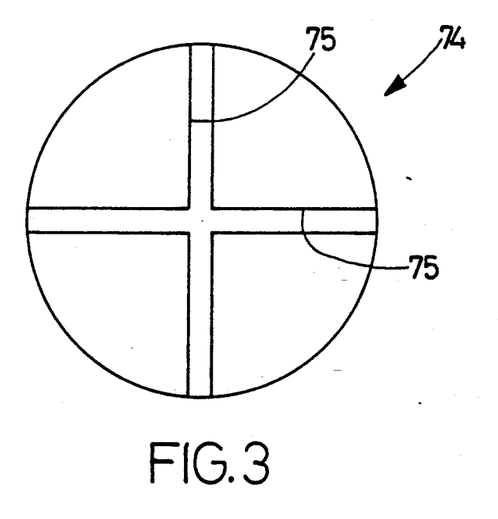
FIG. 3 is a bottom plan view of the intermediate rigid plate of FIG. 2.

As shown in FIGS. 2 and 3, the intermediate rigid plate 74 has two grooves 75, 75 formed in one of its opposite major surfaces which abuts on the biasing rubber member 58. These grooves 75, 75, which extend in diametric directions of the plate 74, intersect at right angles at the center of the plate 74. With the intermediate rigid plate 74 with the grooves 75 abutting on the biasing rubber member 58, the air in the air chamber 64 is introduced through the grooves 75 into a central portion of the interface between the rigid plate 74 and rubber member 58. It follows that in the instant embodiment the grooves 75, 75 formed in the intermediate rigid plate 74 serve as means for forming air passage for permitting air flow between the air chamber 64 and a space between abutting faces of the rigid plate 74 and biasing rubber member 58.

With the instant engine mount installed in position with an air conduit 76 attached to the connector 68, the above-indicated operating chamber 70 is connected to a switch valve 78, through the air passage 66, connector 68 and air conduit 76. The air conduit 76 is also connected to an external vacuum pressure source 80 via the switch valve 78. The vacuum pressure source 80 serves to provide a vacuum or sub-atmospheric pressure which is lower than the atmospheric pressure. The switch valve 78 is selectively placed in a first position for communication of the operating chamber 70 with the atmosphere, and a second position for communication of the operating chamber 70 with the vacuum pressure source 80, so that a selected one of the atmospheric pressure and the vacuum pressure is applied to the operating chamber 70.

Figure 4:
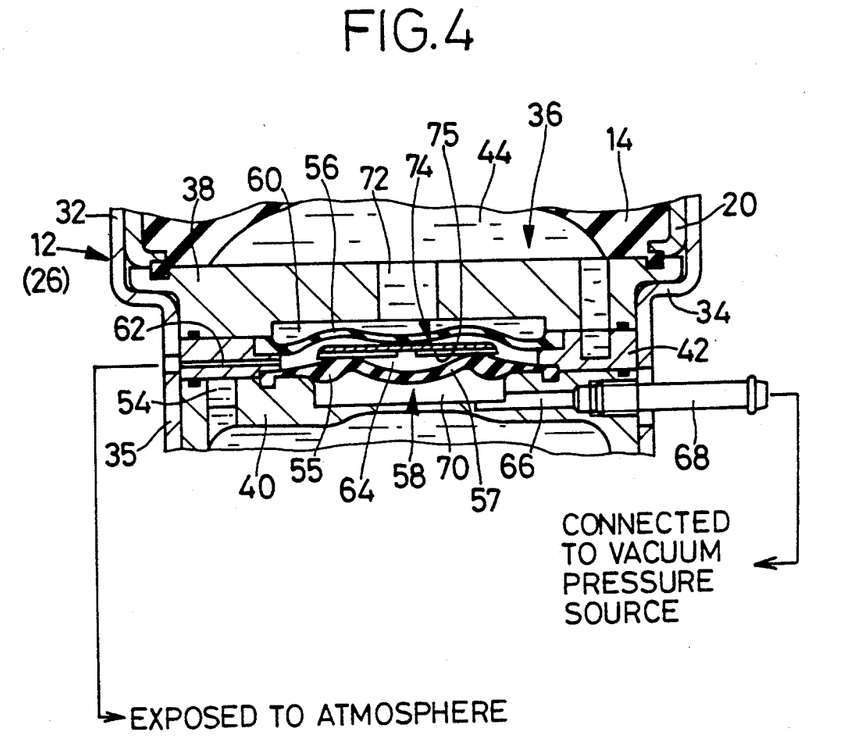
FIG. 4 is a fragmentary cross sectional view of the engine mount of FIG. 1, when an operating chamber of the mount is connected to a vacuum pressure source.

When the switch valve 78 is placed in the second position, that is, when the operating chamber 70 is connected to the vacuum pressure source 80, the chamber 70 is evacuated so that vacuum force acts on the biasing rubber member 58. Therefore, the rubber member 58 is deformed or displaced toward the lower partition member 40 away from the opening of the second orifice passage 72, against the elasticity of the rubber member 58, as shown in FIG. 4. As a result, the biasing force of the rubber member 58 acting on the second diaphragm 56 is eliminated, whereby the second diaphragm 56 is spaced apart from the opening of the second orifice passage 72. Consequently, the second orifice passage 72 is brought into fluid communication with the second equilibrium chamber 60. At the same time, the second flexible diaphragm 56 is allowed to elastically deform so as to accommodate volume changes of the second equilibrium chamber 60. In the instant embodiment, the engine mount utilizes a vacuum pressure in an intake pipe of the vehicle engine, as the pressure supplied by the vacuum pressure source 80.

With the intermediate rigid plate 74 interposed between the top plate 57 of the biasing rubber member 58 and the second diaphragm 56, the internal pressure of the pressure-receiving chamber 44 is applied to the biasing rubber member 58 through the second diaphragm 56, as surface pressure received by the entire area of the top plate 57, whereby the rubber member 58 is susceptible to no bending deformation of the leg portion 55 and top plate 57. Upon application of the internal pressure of the pressure-receiving chamber 44, therefore, the biasing rubber member 58 deforms mainly due to its compression, resulting in a relatively hard spring characteristic of the mount. The intermediate rigid plate 74 is desirably dimensioned so a to cover one major surface of the biasing rubber member 58 abutting on the second diaphragm 56, namely, almost the entire area of the top plate 57 including the small-diameter end face of the leg portion 55, so that the internal pressure of the pressure-receiving chamber 44 acts as a surface pressure on the rubber member 58 through the rigid plate 74.

When the operating chamber 70 is connected to the vacuum pressure source 80, the vacuum force acting on the biasing rubber member 58 directly causes bending deformation of the top plate 57 of the rubber member 58. Further, since the air is introduced into between the mutually abutting faces of the top plate 57 and the intermediate rigid plate 74 through the grooves 75, 75 formed in the rigid plate 74, the top plate 57 is allowed to freely deform due to the vacuum force applied thereto, without suffering from adhesion of the plate 57 to the rigid plate 74. Accordingly, the vacuum force acting on the biasing rubber member 58 upon evacuation of the operating chamber 70 mainly causes shearing deformation of the rubber member 58, resulting in a relatively soft spring characteristic of the mount.

The material and dimensions of the biasing rubber member 58 are determined so that the rubber member 58 provides a degree of elasticity large enough to keep the second orifice passage 72 closed by the second diaphragm 56 when the operating chamber 70 is exposed to the atmosphere, upon application of the low-frequency vibrations which should be damped based on the fluid flow through the first orifice passage 54. The vacuum pressure source 80 is designed to provide a suitable amount of vacuum force for drawing or sucking the biasing rubber member 58 against its elasticity, to thereby allow the second diaphragm 56 to be spaced a suitable distance apart from the upper partition member 38, upon application of the high-frequency vibrations which should be isolated based on the fluid flow through the second orifice passage 72.

More specifically, the spring constant "K1" of the biasing rubber member 58 to be exhibited upon its deformation by the fluid pressure of the pressure-receiving chamber 44 is determined so as to satisfy the following formula (1), so that the second orifice passage 72 is kept closed by the second diaphragm 56 against the force produced by the fluid pressure when the engine mount receives the low-frequency vibrations:

$$P \times a < K \times X0 \qquad (1)$$

where,
P: pressure of the fluid in the pressure-receiving chamber 44 which arises upon application of low-frequency vibrations
a: cross sectional area of the opening of the second orifice passage 72 which is open to the second equilibrium chamber 60
X0: amount of pre-load applied to the biasing rubber member 58 as installed on the engine mount.

The vacuum pressure Pv applied from the vacuum pressure source 80 to the operating chamber 70 is determined so as to satisfy the following formula (2), so that the second orifice passage 72 permits effective fluid flow therethrough so as to isolate the high-frequency vibrations when the operating chamber 70 is evacuated:

$$K2 \times X1 < Pv \times A \qquad (2)$$

where,
K2: spring constant of the biasing rubber member 58 to be exhibited upon its deformation by the vacuum force exerted thereon upon evacuation of the operating chamber 70
A: effective surface area of the biasing rubber member 58 which receives the vacuum pressure, (which area is almost equal to the area of the top plate 57)
X1: amount of pre-load applied to the biasing rubber member 58, which is determined to ensure effective fluid flow through the second orifice passage 72 and allow elastic deformation of the second diaphragm 56 to absorb volume changes of the second equilibrium chamber 60 upon application of high-frequency vibrations.

In the instant embodiment, the biasing rubber member 58 is designed such that its spring constant K1 for the elastic deformation by the fluid pressure of the pressure-receiving chamber 44 is larger than its spring constant K2 for the elastic deformation by the vacuum pressure in the operating chamber 70. Therefore, the biasing rubber member 58 assures a biasing force large enough to keep the second orifice passage 72 closed, against the fluid pressure of the pressure-receiving chamber 44 which is raised by elastic deformation of the elastic body 14 upon application of vibrations. Further, the biasing rubber member 58 can be readily sucked and deformed with a relatively small amount of vacuum force acting thereon, so that the second orifice passage 72 communicates with the second equilibrium chamber 60. Thus, the control of opening and closing the second orifice passage 72 is surely accomplished by the relatively small amount of vacuum force acting on the biasing rubber member 58.

In the thus constructed engine mount as installed in place as shown in FIG. 1, upon application of vibrations between the first and second support members 10, 12, the non-compressible fluid is forced to flow between the pressure-receiving chamber 44 and the first and second equilibrium chambers 48, 60, through the first and second orifice passages 54, 72, based on a pressure difference between the pressure-receiving chamber 44 and the two equilibrium chambers 48, 60. In the instant embodiment, the fluid is forced to flow through either the first orifice passage 54 or the second orifice passage 72, by placing the switch valve 78 selectively in the first position in which the operating chamber 70 is exposed to the atmosphere, and the second position in which the operating chamber 70 is connected to the vacuum pressure source 80. Thus, the instant engine mount exhibits desired vibration damping or isolating characteristics, depending upon the type of the vibrations applied thereto, based on the resonance of the fluid mass in the first or second orifice passage 54, 72.

More specifically described, when the engine mount receives low-frequency vibrations such as engine shake or bounce, which should be damped by fluid flow through the first orifice passage 54, the switch valve 78 is operated to the first position for exposing the operating chamber 70 to the atmosphere. As a result, the second orifice passage 72 is closed by the second diaphragm 56, thereby inhibiting the fluid to flow therethrough, as shown in FIG. 1. Accordingly, the fluid is forced to flow only through the first orifice passage 54 between the pressure-receiving chamber 44 and the first equilibrium chamber 48, based on alternate pressure changes which occur in the pressure-receiving chamber 44 upon application of the low-frequency vibrations. Thus, the engine mount is able to effectively damp the low-frequency vibrations, based on the resonance of the fluid flowing through the first orifice passage 54.

On the other hand, when the engine mount receives high-frequency vibrations such as engine idling vibrations, which should be isolated by the fluid flow through the second orifice passage 72, the switch valve 78 is operated to the second position for connecting the operating chamber 70 to the vacuum pressure source 80. As a result, the biasing rubber member 58 is drawn toward the lower partition member 40, whereby the second orifice passage 72 is brought into communication with the second equilibrium chamber 60, as shown in FIG. 4. Consequently, effective flow of the fluid occurs between the pressure-receiving chamber 44 and second equilibrium chamber 60, through the second orifice passage 72, while the second diaphragm 56 is allowed to elastically deform to thereby absorb volume changes of the equilibrium chamber 60. Thus, the instant engine mount provides a sufficiently reduced dynamic spring constant with respect to the high-frequency vibrations, based on the resonance of the fluid flowing through the second orifice passage 72. In this condition, the first orifice passage 54 is also held in fluid communication with the pressure-receiving chamber 44 and the first equilibrium chamber 48. However, the fluid is less likely to flow between these two fluid chambers 44, 48, due to relatively large resistance to the fluid flow through the first orifice passage 54 whose ratio of the cross sectional area to the length is smaller than that of the second orifice passage 72. In substance, the high-frequency vibrations cause the fluid to effectively flow only through the second orifice passage 72, between the pressure-receiving and second equilibrium chambers 44, 60.

It will be understood from the above description that the vacuum pressure source 80, switch valve 78, air conduit 76 and connector 68 constitute pressure control means for applying a vacuum pressure to the operating chamber 70 to draw the biasing elastic member 58 away from the second diaphragm 56, thereby eliminating the biasing force acting on the second diaphragm 56, so that the second diaphragm 56 is moved away from the opening of the second orifice passage 72, thereby opening the second orifice passage 72 for fluid communication with the second equilibrium chamber 60.

In the manners as described above, the instant engine mount is able to exhibit different vibration damping or isolating characteristics depending upon the type of the input vibrations, by simply controlling the switch valve 78 according to the operating condition of the vehicle. Namely, the switch valve 55 is controlled such that the operating chamber 70 is exposed to the atmosphere while the vehicle is running, and such that the same chamber 70 is connected to the vacuum pressure source 70 while the vehicle is at a stop with the engine idling. In this arrangement, the engine mount provides a sufficiently high damping effect with respect to engine shakes and other low-frequency vibrations usually generated during running of the vehicle, based on the resonance of the fluid mass in the first orifice passage 54. Further, the elastic mount provides a sufficiently low dynamic spring constant with respect to the engine idling vibrations generated while the vehicle is parked with the engine idling, based on the resonance of the fluid mass in the second orifice passage 72. Thus, the engine mount according to the present invention assures significantly improved driving comfort of the vehicle.

Figure 5:
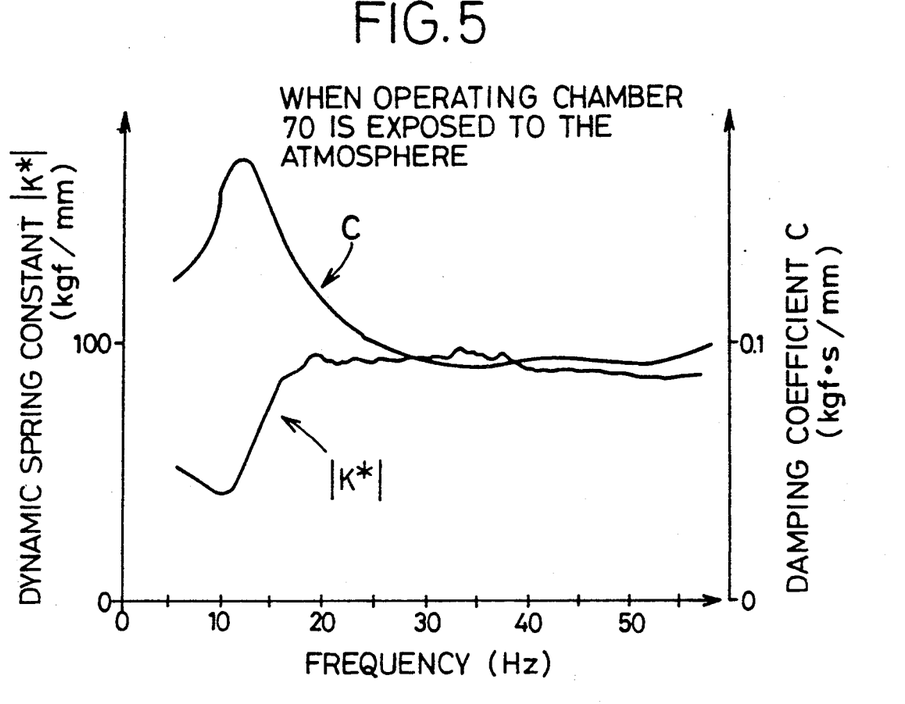
FIG. 5 is a graph indicating the result of measurement of vibration damping/isolating characteristics of the engine mount of FIG. 1 when the mount is exposed to the atmosphere.
Figure 6:
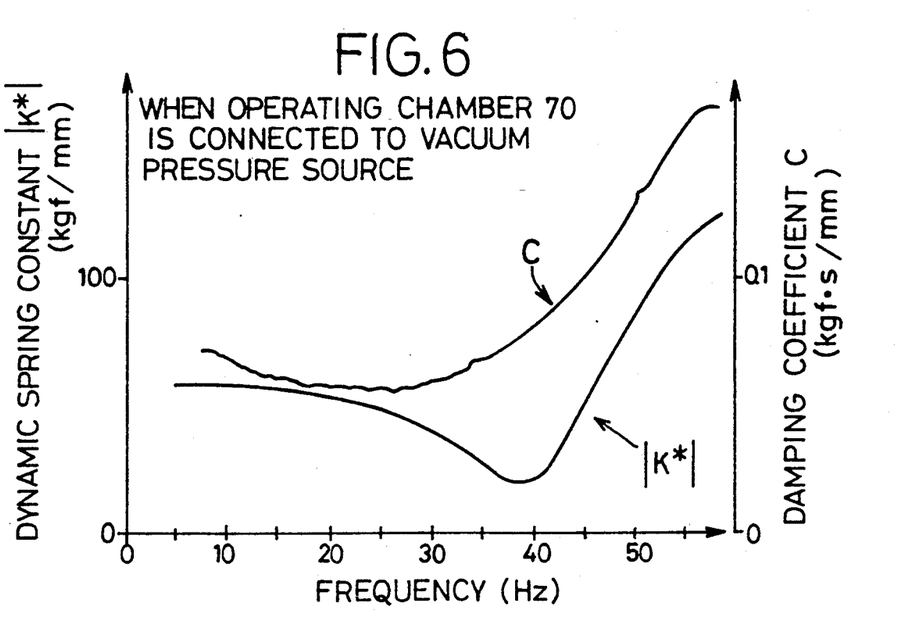
FIG. 6 is a graph indicating the result of measurement of vibration damping/isolating characteristics of the engine mount of FIG. 1 when the mount is connected to the vacuum pressure source.

Referring to the graphs of FIGS. 5 and 6, there are shown some results of measurement of the vibration damping and isolating characteristics of the engine mount constructed as described above, with respect to input vibrations having an amplitude of ±0.1 mm, when the operating chamber 70 is exposed to the atmosphere (FIG. 5) or connected to the vacuum pressure source 80 (FIG. 6). It will be understood from the results that the present engine mount selectively provides a considerably high damping effect for the vibrations in a relatively low frequency range around 10Hz, such as engine shakes, and a significantly lowered dynamic spring constant for the vibrations in a relatively high frequency range around 25–45Hz, such as engine idling vibrations.

In the engine mount as described above, in particular, the spring constant K1 of the biasing rubber member 58 exhibited upon its deformation due to the fluid pressure of the pressure-receiving chamber 44 is set to be larger than the spring constant K2 of the rubber member 58 exhibited upon its deformation due to the vacuum force exerted thereon in the operating chamber 70. Accordingly, upon application of low-frequency vibrations to the mount, the second orifice passage 72 is surely and stably kept in its closed position due to the relatively large spring constant K1 of the rubber member 58. At the same time, the second orifice passage 72 may be readily opened with a relatively small vacuum force acting on the biasing rubber member 58 in the operating chamber 70, due to the relative small spring constant K2 of the rubber member 58. Thus, the second orifice passage 72 is selectively placed in its open or closed position with high certainty and operating reliability, thereby stably assuring excellent vibration damping and isolating capability of the engine mount.

In the instant engine mount, the fluid in the mount is forced to flow selectively through the first or second orifice passage 54, 72, by simply operating the switch valve 78 so as to change the pressure in the operating chamber 70. Therefore, the present engine mount does not require an actuator and other components to be incorporated in its structure, for providing the two different operating characteristics as described above. Thus, the present engine mount is comparatively simple in construction and compact in size.

In the engine mount of the instant embodiment, the second orifice passage 72 is brought into communication with the second equilibrium chamber 60 when the operating chamber 0 is connected to the vacuum pressure source 80, so that the high-frequency vibrations such as engine idling vibrations can be effectively isolated by the fluid flow through the second orifice passage 72. Where the principle of the present invention is applied to a vehicle engine mount as in the instant embodiment, therefore, the mount may efficiently utilize a relatively large vacuum pressure in the intake pipe of the engine during the engine idling operation, as the vacuum pressure source 80 for supplying the operating chamber 70 with the vacuum pressure. This advantageously eliminates the necessity of using a large-sized pressure accumulator, thus simplifying the construction of the vacuum pressure source 80.

Further, in the instant engine mount, a layer of the air (the second air chamber 64) is interposed between the second diaphragm 56 and the biasing rubber member 58. Therefore, the second flexible diaphragm 56 may be made of a rubber material having high resistance to the fluid (e.g., ethylene glycol), and the biasing rubber member 58 may be made of a rubber material having high resistance to oil or gasoline, so as to protect the engine mount from vaporized gasoline, for example, which is introduced from the intake pipe of the engine into the operating chamber 70 when the intake pressure of the engine is utilized as the vacuum pressure supplied by the vacuum pressure source 80. Thus, the instant engine mount is free from adverse influence of the vaporized gasoline or other foreign matters, assuring a sufficiently high degree of durability.

Further, the second equilibrium chamber 60 is formed within the partition structure 36 in the instant embodiment, whereby the whole size of the engine mount is further reduced.

Figure 7:
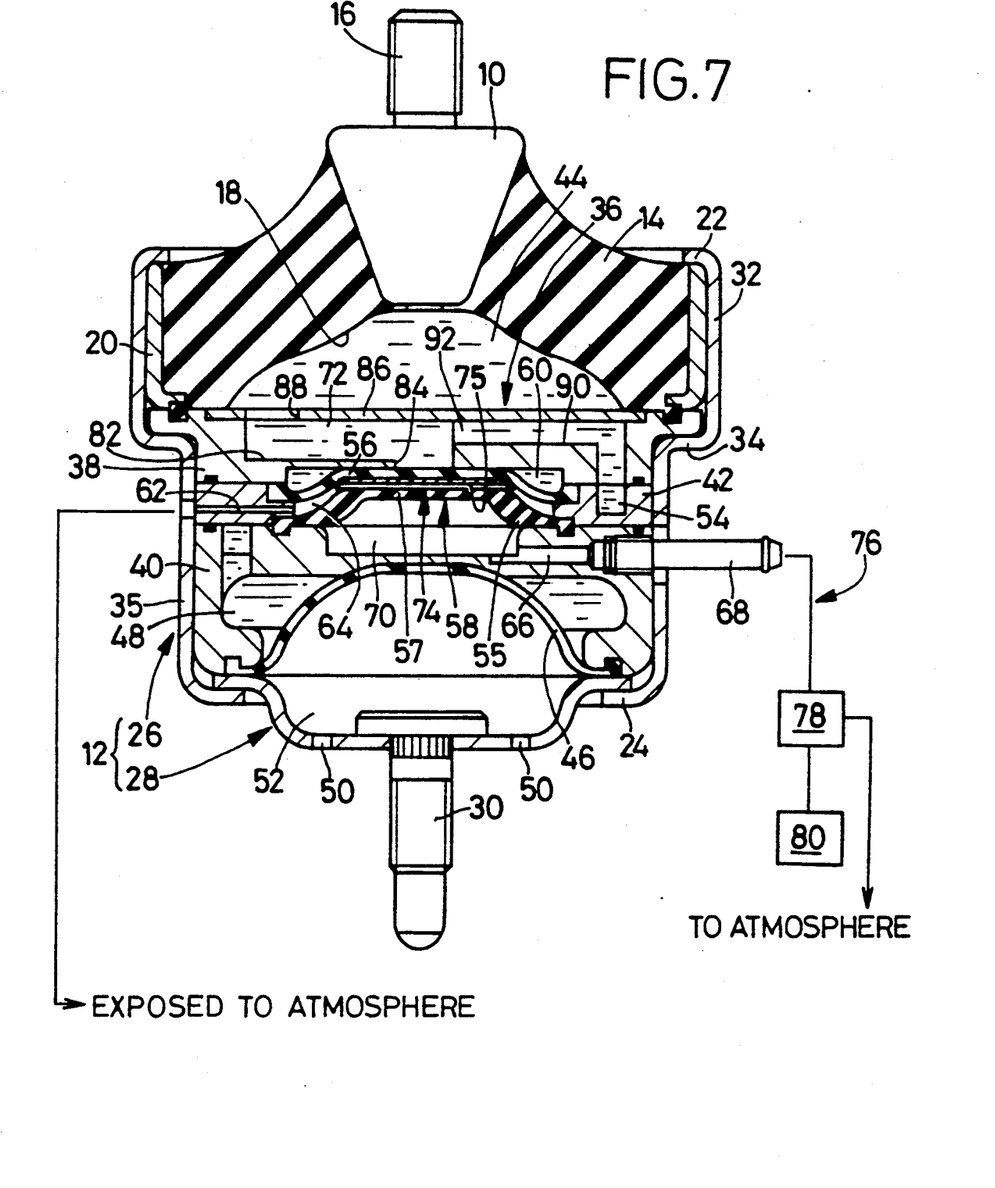
FIG. 7 is an elevational view in axial cross section of another embodiment of the fluid-filled elastic mount of the present invention in the form of a vehicle engine mount.

Referring next to FIG. 7, there is shown another embodiment of the engine mount constructed according to the present invention. This embodiment is different from the above-described first embodiment only in the structure of the orifice passages. In the following description, the same reference numerals as used in the first embodiment will be used for identifying structurally corresponding elements and portions, of which no detailed description will be provided.

In the engine mount of this embodiment, the upper partition member 38 of the partition structure 36 is formed with a radial groove 82 which extends radially outwards from the center of the member 38. The upper partition member 38 further has a center hole 84 formed through the thickness thereof. The radial groove 82 communicates at its radially inner end with the second equilibrium chamber 60 through the center hole 84. The radial groove 82 is covered by a disc-like metallic lid member 86 which is superposed on the upper partition member 83, and communicates at its radially outer end with the pressure-receiving chamber 44, through a hole 88 formed through the lid member 86. It will be understood that the radial groove 82 formed in the upper partition member 38 provides the second orifice passage 72 which communicates with the pressure-receiving chamber 44 and the second equilibrium chamber 60 to allow fluid flow therethrough between the two fluid chambers 44, 60.

The upper partition member 38 is further formed with a radial groove 90 which connects the radially inner end of the above radial groove 82 with the first orifice passage 54. The radial groove 90 is also covered by the lid member 86, to provide a connecting passage 92 for connecting the second orifice passage 72 with one open end of the first orifice passage 54. Namely, the first orifice passage 54 communicates with the pressure-receiving chamber 44 through the second orifice passage 72 and connecting passage 92. In the instant embodiment, the first and second orifice passages 54, 72 are formed in the partition structure 36 such that the two passages 54, 72 are connected in series to each other.

In the thus constructed engine mount having the first and second orifice passages 54, 72 as described above, the fluid is caused to flow through either the first and second orifice passage 54, 72 or the second orifice passage 72 alone, by placing the switch valve 78 selectively in the first position in which the operating chamber 70 is open to the atmosphere, and the second position in which the operating chamber 70 is connected to the vacuum pressure source 80. Thus, the engine mount of this embodiment offers the same effects as provided in the first embodiment.

More specifically, when the operating chamber 70 is open to the atmosphere, the center hole 84 is closed by the second flexible diaphragm 56, based on the elasticity of the biasing rubber member 58, whereby the second orifice passage 72 is disconnected from the second equilibrium chamber 60. As a result, the fluid flowing from the pressure-receiving chamber 44 into the second orifice passage 72 is fed into the first equilibrium chamber 48 through the first orifice passage 54, so that the engine mount exhibits an excellent vibration damping effect based on the fluid flow through the first orifice passage 54. On the other hand, when the operating chamber 70 is connected to the vacuum pressure source 80, the second orifice passage 72 is held in communication with the second equilibrium chamber 60 such that volume changes in the chamber 60 are absorbed due to the elastic deformation of the second flexible diaphragm 56. As a result, the fluid is forced to flow through the second orifice passage 72 having lower resistance to the fluid flow than the first orifice passage 54, whereby the engine mount exhibits a sufficiently reduced dynamic spring constant based on the fluid flow through the second orifice passage 72.

While the present invention has been described in its presently preferred embodiments with a certain degree of particularity, for illustrative purpose only, it is to be understood that the invention is not limited to the details of the illustrated embodiments, but may be embodied otherwise.

For example, the shape and number of the grooves formed in the intermediate rigid plate 74 are not limited to those of the illustrated embodiments, but may be changed as desired.

Further, the above-indicated air passage for guiding the air between the abutting faces of the intermediate rigid plate 74 and biasing rubber member 58 is by no means limited to the grooves formed in the rigid plate 74, but may be provided by forming projections on the rigid plate 74 or forming grooves or projections on the biasing rubber member 58.

It is also possible to form the air passage between the abutting faces of the intermediate rigid plate 74 and the second diaphragm 56, or to form through the rigid plate 74 a through-hole which communicates with the above air passage formed between the rigid plate 74 and the biasing rubber member 58, so that the air is easily guided between the abutting faces of the rigid plate 74 and the second diaphragm 56. This arrangement permits the intermediate rigid plate 74 to be easily spaced apart from the second diaphragm 56 as needed.

Figure 8:
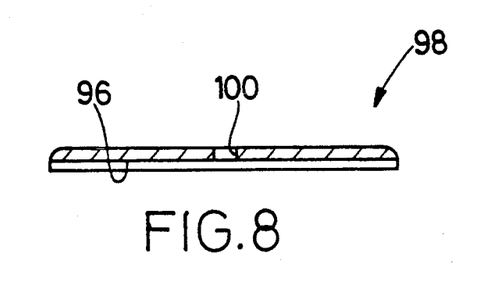
FIG. 8 is an enlarged axial cross sectional view showing another example of intermediate rigid plate used in the engine mount as shown in FIG. 1.
Figure 9:
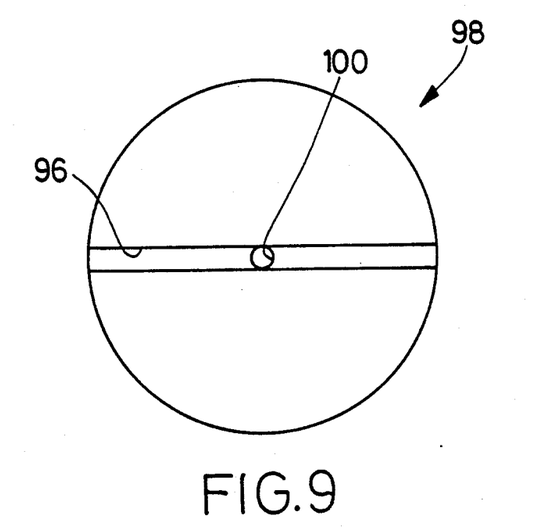
FIG. 9 is a bottom plan view of the intermediate rigid plate of FIG. 8.

Referring next to FIGS. 8 and 9, there is shown another example of intermediate rigid plate 98 suitably used in the engine mounts of the illustrated embodiments. The intermediate rigid plate 98 has a groove 96 formed in its diametric direction in one of opposite major surfaces facing the biasing rubber member 58. The rigid plate 98 further has a through-hole 100 formed through the thickness thereof at the central portion of the groove 96. The groove 96 forms the air passage for guiding the air between the abutting faces of the rigid plate 98 and the biasing rubber member 58, while the through-hole 100 forms the air passage for guiding the air into between the abutting faces of the rigid plate 98 and the second diaphragm 56.

While the leg portion 55 of the biasing rubber member 58 has a hollow truncated conical shape or tapered shape in the illustrated embodiments, the biasing rubber member may have a cylindrical leg portion having substantially the same diameter over its entire length.

Further, the constructions and shapes of the first and second orifice passages are by no means limited to those of the illustrated embodiments, but may be suitably modified depending upon the required vibration damping or isolating characteristics of the elastic mount.

While the second equilibrium chamber 60 is formed within the partition structure 36 in the illustrated embodiments, the second equilibrium chamber 60 may be formed between the partition structure 36 and the second support member 12 such that the first and second equilibrium chambers 48, 60 are juxtaposed in the radial direction of the elastic mount.

In the illustrated embodiments, the first and second orifice passages 54, 72 are tuned to the respective resonance frequencies and function independently of each other, irrespective of whether these orifice passages 54, 72 are connected to each other or not. When the first and second orifice passages 54, 72 are connected in series as in the second embodiment, however, these two orifice passages 54, 72 may function as one orifice passage through which the fluid flow between the pressure-receiving chamber 44 and the first equilibrium chamber 48. In this case, the one orifice passage is tuned in view of the ratio of the cross sectional areas of the two orifice passages 54, 72 and the manner of connecting these two passages 54, 72, so that the elastic mount exhibits a desired vibration damping characteristic, based on the resonance of the fluid flowing through the one orifice passage.

Furthermore, the present elastic mount may be provided with means for controlling elastic deformation of the first flexible diaphragm 46 which allows volume changes of the first equilibrium chamber 48. Upon application of the high-frequency vibrations which should be isolated based on fluid flow through the second orifice passage 72, the above-indicated means operates to prevent or inhibit the elastic deformation of the first diaphragm 46, to thereby permit a sufficiently large amount of the fluid to flow through the second orifice passage 72. Thus, the provision of the above-indicated means leads to an improved vibration isolating capability of the mount.

While the illustrated embodiments of the invention are used as engine mounts for a motor vehicle, the principle of the present invention is equally applicable to any fluid-filled elastic mounts other than the engine mount, for example, to a vehicle body mount and a cab mount for the vehicle, and even applicable to fluid-filled vibration damping/isolating components used for various devices or equipment other than those for motor vehicles.

It is to be understood that the present invention may be embodied with various other changes, modifications and improvements, which may occur to those skilled in the art, without departing from the scope of the invention defined in the following claims.

What is claimed is:

1. A fluid-filled elastic mount for flexibly connecting two members, comprising:

a first support member and a second support member which are respectively fixed to the two members to be flexibly connected, and which are spaced apart from each other in a load-receiving direction in which vibrations are applied to the elastic mount;

an elastic body interposed between said first and second support members for elastically connecting the first and second support members;

a partition structure supported by said second support member and extending in a direction substantially perpendicular to said load-receiving direction;

said elastic body at least partially defining a pressure-receiving chamber disposed on one of opposite sides of said partition structure on the side of said first support member said pressure-receiving chamber being filled with a non-compressible fluid, a pressure of said fluid in said pressure-receiving chamber changing due to elastic deformation of said elastic body upon application of the vibrations in said load-receiving direction;

a first flexible diaphragm cooperating with said partition structure to define a first equilibrium chamber which is filled with said non-compressible fluid, said first flexible diaphragm being elastically deformable so as to permit volume changes of said first equilibrium chamber to absorb pressure changes of said fluid in said first equilibrium chamber;

means for defining a first orifice passage which communicates with said pressure-receiving chamber and said first equilibrium chamber so as to permit flow of said fluid therebetween;

a second flexible diaphragm cooperating with said partition structure to define a second equilibrium chamber which is filled with said non-compressible fluid, said second flexible diaphragm being elastically deformable so as to permit volume changes of said second equilibrium chamber to absorb pressure changes of said fluid in said second equilibrium chamber;

means for defining a second orifice passage which communicates with said pressure-receiving chamber and said second equilibrium chamber so as to permit flow of said fluid therebetween, said second orifice passage having a ratio of a cross sectional area thereof to a length thereof, which ratio is higher than that of said first orifice passage; a biasing elastic member disposed on one of opposite sides of said second flexible diaphragm remote from said second equilibrium chamber, said biasing elastic member including a top plate facing said second flexible diaphragm and having a biasing force for forcing said second flexible diaphragm to close an opening of said second orifice passage;

said biasing elastic member cooperating with said second flexible diaphragm to define therebetween an air chamber which is exposed to an atmosphere and permits elastic deformation of said second flexible diaphragm;

a rigid planar member accommodated in said air chamber between said second flexible diaphragm and said top plate of said biasing elastic member, said biasing force of said biasing elastic member acting on said second flexible diaphragm through said rigid planar member;

means for forming an air passage between abutting faces of said rigid planar member and said top plate of said biasing elastic member, for permitting an air flow into a central portion of said abutting faces upon abutting contact between said rigid planar member and said biasing elastic member;

said biasing elastic member partially defining an operating chamber which is separated from said air chamber by said biasing elastic member; and pressure control means for applying a vacuum pressure to said operating chamber to draw said biasing elastic member away from said second flexible diaphragm, thereby eliminating said biasing force acting on said second flexible diaphragm, so that said second flexible diaphragm is moved away from said opening of said second orifice passage, thereby opening said second orifice passage for fluid communication with said second equilibrium chamber.

2. A fluid-filled elastic mount according to claim 1, wherein said partition structure has a space which is divided by said second flexible diaphragm and said biasing elastic member into said second equilibrium chamber, said air chamber and said operating chamber, said partition structure further having a hole as said second orifice passage, through which said second equilibrium chamber communicates with said pressure-receiving chamber.

3. A fluid-filled elastic mount according to claim 2, wherein said biasing elastic member further includes a leg portion having a hollow truncated conical shape and closed by said top plate at one axial end thereof on the side of said second flexible diaphragm, said biasing elastic member being supported at the other axial end of said leg portion by said partition structure.

4. A fluid-filled elastic mount according to claim 2, wherein said biasing elastic member further includes a leg portion having a generally cylindrical shape and closed by said top plate at one axial end thereof on the side of said second flexible diaphragm, said biasing elastic member being supported at the other axial end of said leg portion by said partition structure.

5. A fluid-filled elastic mount according to claim 1, wherein said means for forming an air passage comprises at least one groove formed in the abutting face of said rigid planar member.

6. A fluid-filled elastic mount according to claim 5, wherein said at least one groove comprises two grooves which extend in diametric directions of said rigid planar member and intersect at right angles at a center of said rigid planar member.

7. A fluid-filled elastic mount according to claim 1, further comprising means for forming another air passage between abutting faces of said rigid planar member and said second flexible diaphragm, for guiding the air into a central portion of said abutting faces upon abutting contact between said rigid planar member and said second flexible diaphragm.

8. A fluid-filled elastic mount according to claim 7, wherein said means for forming another air passage comprises a center hole formed through the thickness of said rigid planar member, said center hole communicating with said air passage formed between said rigid planar member and said biasing elastic member.

9. A fluid-filled elastic mount according to claim 2, wherein said partition structure consists of an upper, an intermediate and a lower partition member which are superposed on each other, said intermediate partition member having a center hole which is substantially closed by the upper and lower partition members to provide said space.

10. A fluid-filled elastic mount according to claim 2, wherein said partition structure has an air passage communicating with said operating chamber, said pressure control means including an air conduit connected to said air passage for applying said vacuum pressure to said operating chamber.

11. A fluid-filled elastic mount according to claim 10, wherein said air conduit is connected to said air passage through a connector having an end portion fitted in said air passage.

12. A fluid-filled elastic mount according to claim 1, wherein said pressure control means includes switching means which is operable between a first position for applying a pressure not lower than an atmospheric pressure to said operating chamber to force said second flexible diaphragm toward said opening of said second orifice passage, and a second position for applying said vacuum pressure to said operating chamber to move said second flexible diaphragm away from said opening of said second orifice passage, said non-compressible fluid flowing substantially exclusively through said first orifice passage when said switching means is placed in said first position, and through said second orifice passage when said switching means is placed in said second position.

13. A fluid-filled elastic mount according to claim 12, wherein said pressure control means further includes a vacuum pressure source for providing said operating chamber with said vacuum pressure when said switching means is placed in said second position, said operating chamber being held in communication with the atmosphere having the atmospheric pressure when said switching means is placed in said first position.

14. A fluid-filed elastic mount according to claim 1, wherein said means for defining a first orifice passage comprises said partition structure, said first orifice passage extending through a radially outer portion of said partition structure in a circumferential direction thereof.

15. A fluid-filled elastic mount according to claim 1, wherein said second support member cooperates with said first flexible diaphragm to define therebetween another air chamber which is exposed to the atmosphere to permit elastic deformation of said first flexible diaphragm.

16. A fluid-filled elastic mount according to claim 1, wherein said first and second orifice passages are formed in said partition structure such that the first orifice passage communicates with said pressure-receiving chamber through said second orifice passage.

17. A fluid-filled elastic mount according to claim 1, wherein said pressure control means is connected to an intake pipe of an engine of a motor vehicle as a source of said vacuum pressure to be applied to said operating chamber.

* * * * *